US010376920B2

(12) United States Patent
Katada et al.

(10) Patent No.: US 10,376,920 B2
(45) Date of Patent: Aug. 13, 2019

(54) LINEAR VIBRATION MOTOR

(71) Applicant: Nidec Copal Corporation, Tokyo (JP)

(72) Inventors: Yoshinori Katada, Tokyo (JP); Shin Odajima, Tokyo (JP); Shiori Ishii, Tokyo (JP); Noboru Segawa, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 15/762,211

(22) PCT Filed: Sep. 27, 2016

(86) PCT No.: PCT/JP2016/078361
§ 371 (c)(1),
(2) Date: Mar. 22, 2018

(87) PCT Pub. No.: WO2017/057314
PCT Pub. Date: Apr. 6, 2017

(65) Prior Publication Data
US 2018/0281020 A1 Oct. 4, 2018

(30) Foreign Application Priority Data

Sep. 28, 2015 (JP) ................................ 2015-190267

(51) Int. Cl.
*H02K 33/18* (2006.01)
*B06B 1/04* (2006.01)
(Continued)

(52) U.S. Cl.
CPC ............. *B06B 1/045* (2013.01); *H02K 33/02* (2013.01); *H02K 33/16* (2013.01); *H02K 33/18* (2013.01);
(Continued)

(58) Field of Classification Search
CPC .......... B06B 1/04; B06B 1/045; H02K 33/18; H02K 33/16; H02K 33/02; H02P 25/032; H02P 7/025; H04M 19/047
See application file for complete search history.

(56) References Cited

U.S. PATENT DOCUMENTS

2002/0195884 A1   12/2002  Ichii et al.
2011/0012441 A1*  1/2011   Oh ........................ B06B 1/045
                                                        310/25
(Continued)

FOREIGN PATENT DOCUMENTS

JP         2002-199689 A    7/2002
JP         2004-73983 A     3/2004
(Continued)

OTHER PUBLICATIONS

International Search Report dated Oct. 25, 2016 during the prosecution of PCT/JP2016/078361, English Translation.

*Primary Examiner* — Naishadh N Desai
(74) *Attorney, Agent, or Firm* — Troutman Sanders LLP

(57) ABSTRACT

This abstract replaces all prior versions of abstract in the application. The linear vibration motor comprises a movable element that is equipped with a magnet portion and a weight portion; a frame that contains the movable element; a coil that is secured to the frame and that drives the magnet portion along an axial direction; an elastic member that is disposed within the frame and that applies, to the movable element, an elastic force that repels the driving force that is applied by the magnet portion; and a guide shaft 8 that is borne on the frame and that guides reciprocating motion of the movable element along the axial direction, wherein: the elastic member rotationally biases the movable element in one direction around the guide shaft 8, and the frame comprises a slide bearing portion (a slide plate) for bearing (Continued)

slidably a portion of the rotationally biased movable element.

8 Claims, 7 Drawing Sheets

(51) Int. Cl.
    *H02K 33/02*     (2006.01)
    *H02P 25/032*     (2016.01)
    *H04M 19/04*     (2006.01)
    *H02K 33/16*     (2006.01)
    *H02P 7/025*     (2016.01)

(52) U.S. Cl.
    CPC ............ *H02P 7/025* (2016.02); *H02P 25/032* (2016.02); *H04M 19/047* (2013.01)

(56) References Cited

U.S. PATENT DOCUMENTS

| | | | | |
|---|---|---|---|---|
| 2014/0035397 A1* | 2/2014 | Endo | ............... | H02K 33/18 310/30 |
| 2015/0137627 A1* | 5/2015 | Katada | ............ | H02K 33/16 310/25 |

FOREIGN PATENT DOCUMENTS

| | | | |
|---|---|---|---|
| JP | 2011-97747 A | 5/2011 |
| JP | 2014-28349 A | 2/2014 |
| JP | 2015-95943 A | 5/2015 |

\* cited by examiner

LINEAR VIBRATION MOTOR

CROSS-REFERENCE TO RELATED APPLICATIONS

This is a U.S. national phase application under 35 U.S.C. § 371 of International Patent Application No. PCT/JP2016/078361, filed Sep. 27, 2016, and claims benefit of priority to Japanese Patent Application No. 2015-190267, filed Sep. 28, 2015. The entire contents of these applications are hereby incorporated by reference.

FIELD OF TECHNOLOGY

The present invention relates to a linear vibration motor.

BACKGROUND

Vibration motors (or "vibration actuators") are built into mobile electronic devices, and are broadly used as devices to communicate to the user, through a vibration, that there is an incoming call, or that a signal, such as an alarm, has been generated, and have become indispensable devices in wearable devices, which are carried on the body of the user. Moreover, in recent years vibration motors have been of interest as devices by which to achieve haptics (skin-sensed feedback) in the human interfaces such as touch panels.

Among the various forms of vibration motors that are under development, there is interest in linear vibration motors that are able to generate relatively large vibrations through linear reciprocating vibrations of a movable element. A conventional linear motor is provided with a weight and a magnet on a movable element side, where an electric current is applied to a coil that is provided on the stator side to cause the Lorentz forces that act on the magnet to form a driving force, to cause the movable element, which is elastically supported along the direction of vibration, to undergo reciprocating vibrations (referencing Japanese Unexamined Patent Application Publication 2011-97747,).

SUMMARY

With smaller and thinner mobile electronic devices there is the need for smaller and thinner vibration motors to be equipped therein. In particular, in electronic devices that are provided with flat-panel display portions, such as smartphones, the space within the device in the direction of thickness, which is perpendicular to the display panel, is limited, and thus there is a strong need for the vibration motor, which is equipped therein, to be thinner.

When attempting to achieve a reduction in the thickness of a linear vibration motor, one may achieve a reduction in thickness while maintaining the volume of the magnet and the mass of the weight through attempting to obtain the desired driving force by securing an adequate magnet volume, and to obtain the desired inertial force through ensuring an adequate mass in the weight, when reducing the thickness through forming into a flat shape the movable element that is provided with the magnet and the weight. In this case, if the movable element were to rotate around the linear vibrational axis, the flat movable element is of a shape wherein the side portions, due to the rotation, would tend to collide with the peripheral frame, so noise would be produced by the collisions, which would produce an actuation noise, and would lead to a problem in the rattling due to the rotation would prevent stabilized operation.

Because of this, in the prior art a stabilized linear vibration has been achieved through suppressing rolling of the movable element around the vibration axis through the provision of two guide shafts. However, when two stationary shafts are provided, the two stationary shafts are provided on both sides of the magnet, and thus a problem is produced in that the width of the linear vibration motor is wide. In recent years there have been requests for linear vibration motors that are to be installed in miniaturized electronic devices to be more compact, not only in the thickness direction, but in the width direction as well. Moreover, it is necessary to maintain the parallel orientation of the two guide shafts, which requires high precision in assembly, and thus there is a problem in that this interferes with increasing productivity.

In the present invention, the handling of such problems is an example of the problem to be solved. That is, objects of the present invention include the ability to reduce the thickness of a linear vibration motor, to prevent the occurrence of actuation noise caused by rotation of the movable element around the vibrational axis, even when the movable element is of a flat shape, to enable stabilized vibration without rattling, to enable a reduction in thickness and a reduction in width, to enable increased productivity, and the like.

In order to achieve such an object, the linear vibration motor of the present invention is equipped with the following structures:

A linear vibration motor having a movable element equipped with a magnet portion and a weight portion;

a coil, secured to the frame, for driving the magnet portion along an axial direction;

an elastic member, disposed within the frame, for applying, to the movable element, an elastic force that opposes the driving force that is applied to the magnet; and a guide shaft, borne on the frame, for guiding reciprocating vibration along the axial direction of the movable element, wherein:

the elastic member biases the movable element rotationally in one direction around the guide shaft and the frame comprises a slide bearing portion for supporting slidably a portion of the movable element that is rotationally biased.

BRIEF DESCRIPTIONS OF THE DRAWINGS

Figure 3A:
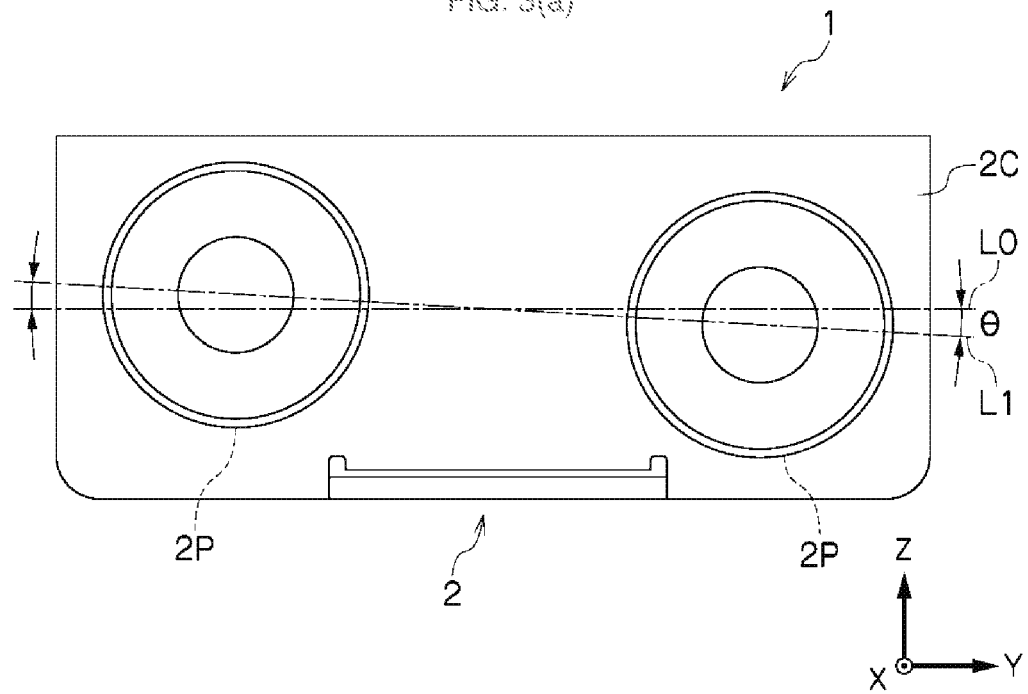
FIG. 3(a) is an explanatory diagram illustrating a front view of the structure of a linear vibration motor according to an example according to the present invention.
Figure 3B:
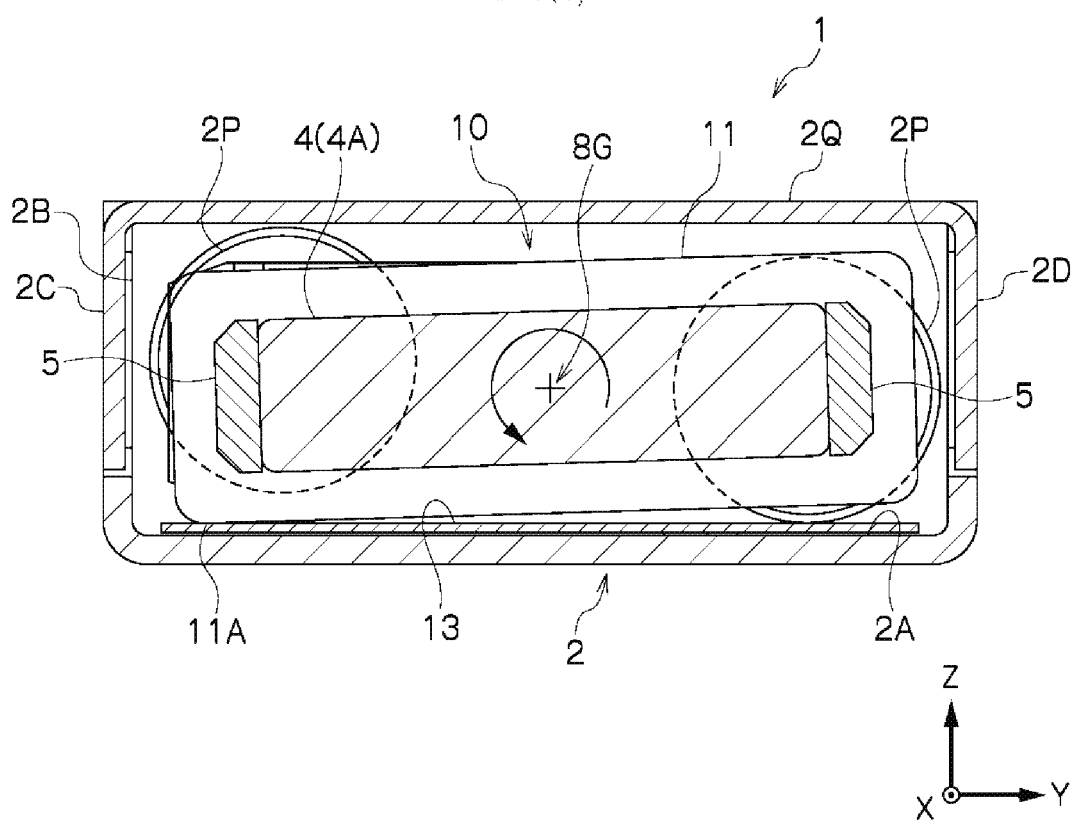
Figure 4:
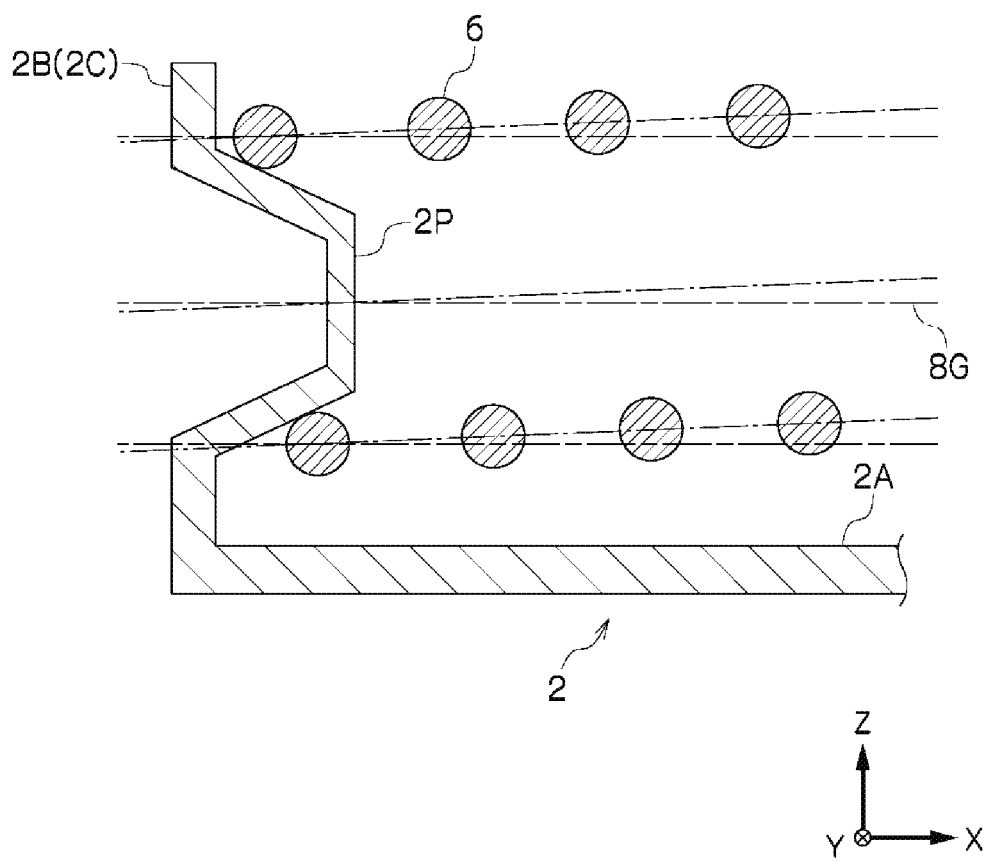

FIG. 3(b) is an explanatory diagram illustrating a cross-sectional diagram that intersects in the X direction of the structure of a linear vibration motor according to an example according to the present invention FIG. 4 is an explanatory diagram illustrating another example configuration wherein the elastic force of the elastic member is applied in a direction that is at an angle relative to the axial direction of the guide shaft.

Figure 5:
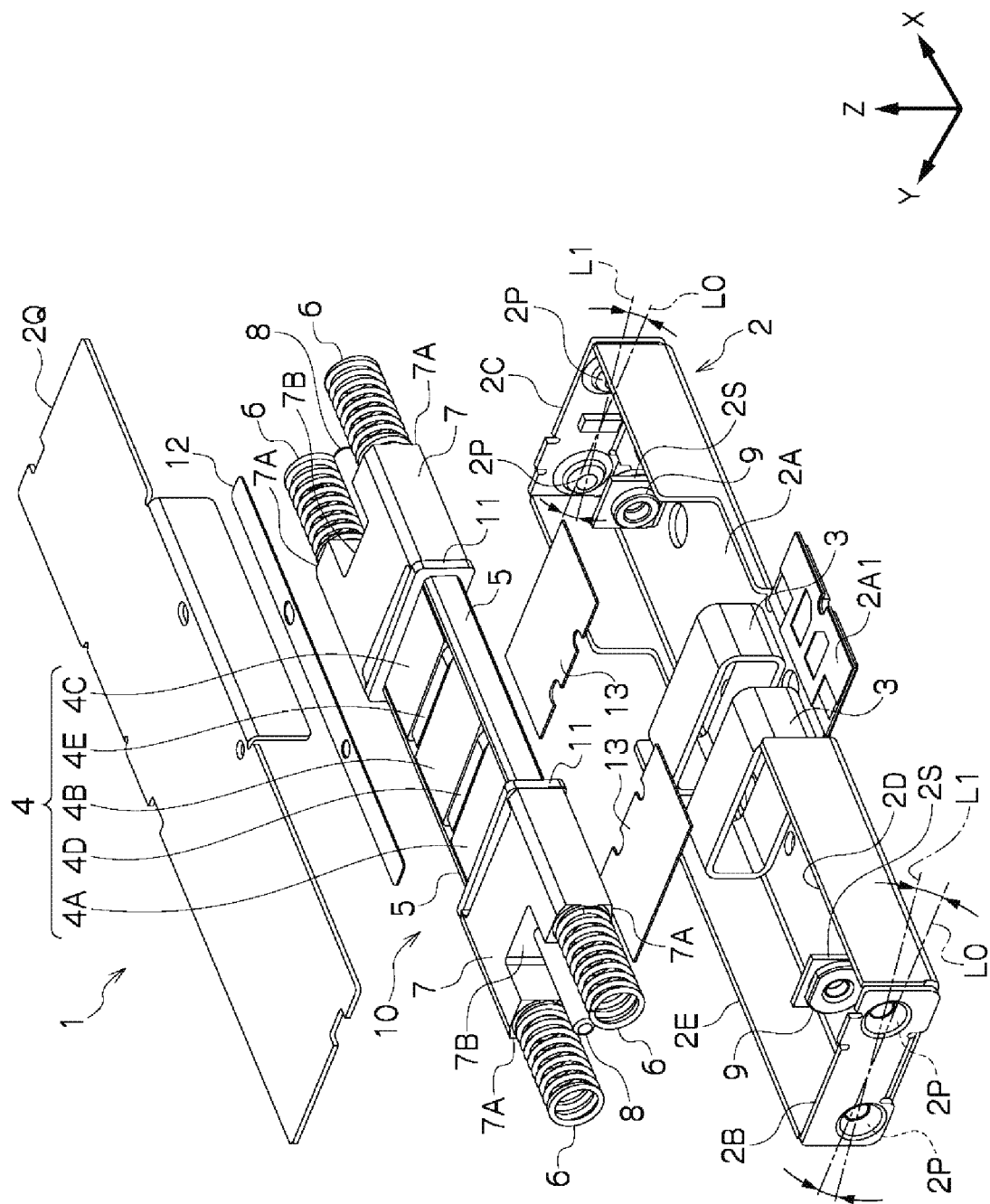

FIG. 5 is an explanatory diagram (an assembly perspective diagram) illustrating another example of a linear vibration motor according to the present invention.

Figure 6:
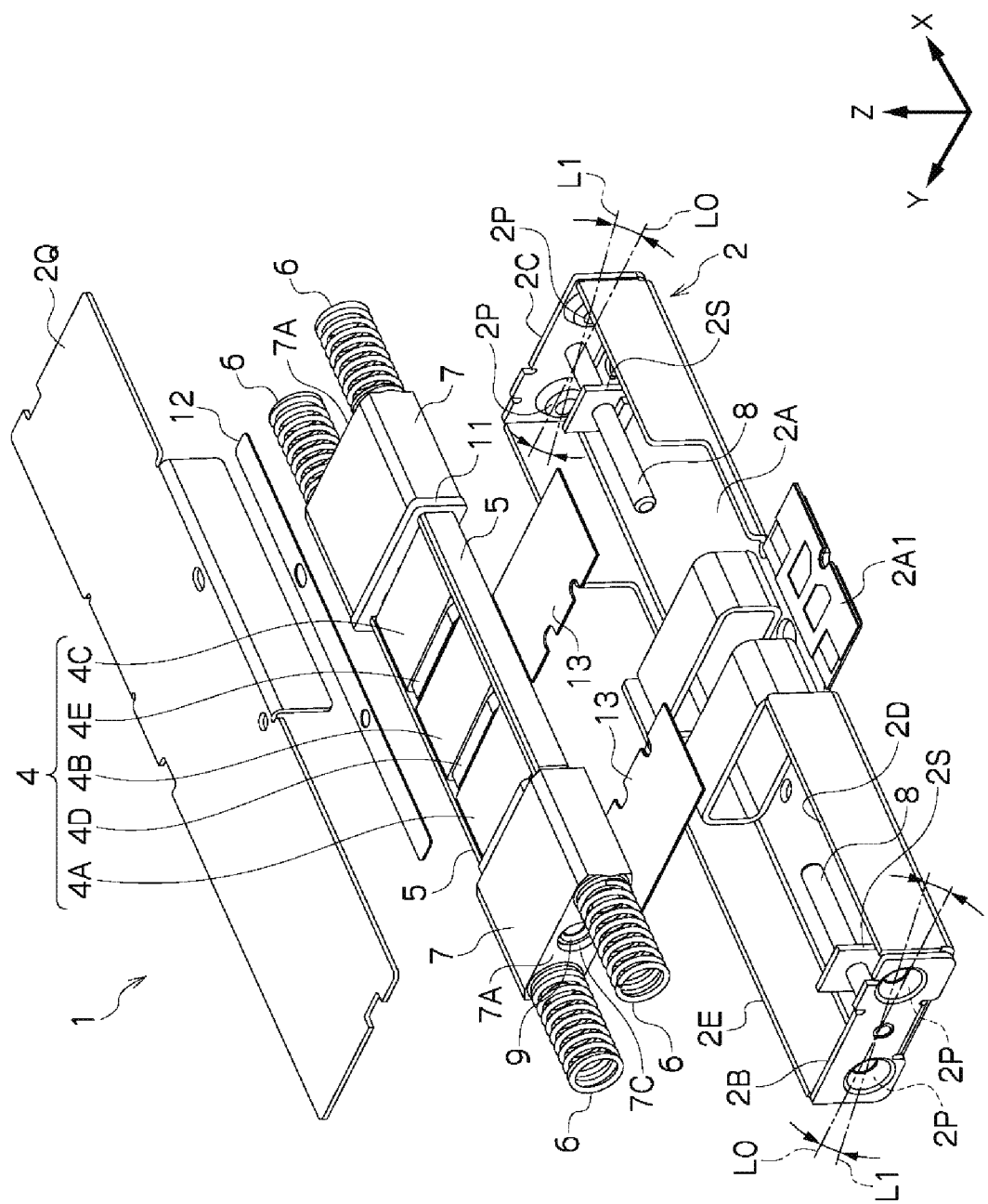

FIG. 6 is an explanatory diagram (an assembly perspective diagram) illustrating another example of a linear vibration motor according to the present invention.

Figure 7:
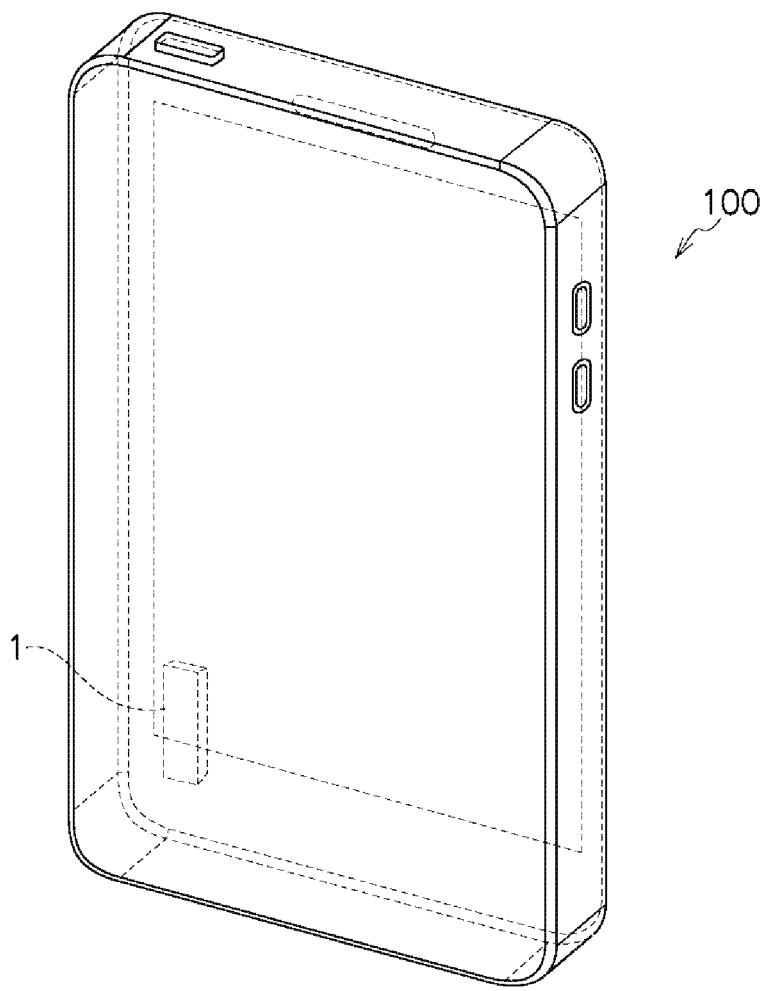

FIG. 7 is an explanatory diagram illustrating the electronic device (a mobile information terminal) equipped with a linear vibration motor according to an example according to the present invention.

DETAILED DESCRIPTION

An example according to the present invention will be explained below in reference to the drawings (where identical reference symbols in different drawings below indicate positions with identical functions, and redundant explanations in the various drawings are omitted). In each of the drawings, the X direction, the Y direction, and the Z direction are directions that are mutually perpendicular, where the X direction indicates the vibrational direction (the axial direction), the Y direction indicates the width direction, and the Z direction indicates the direction of thickness (height).

Figure 1:
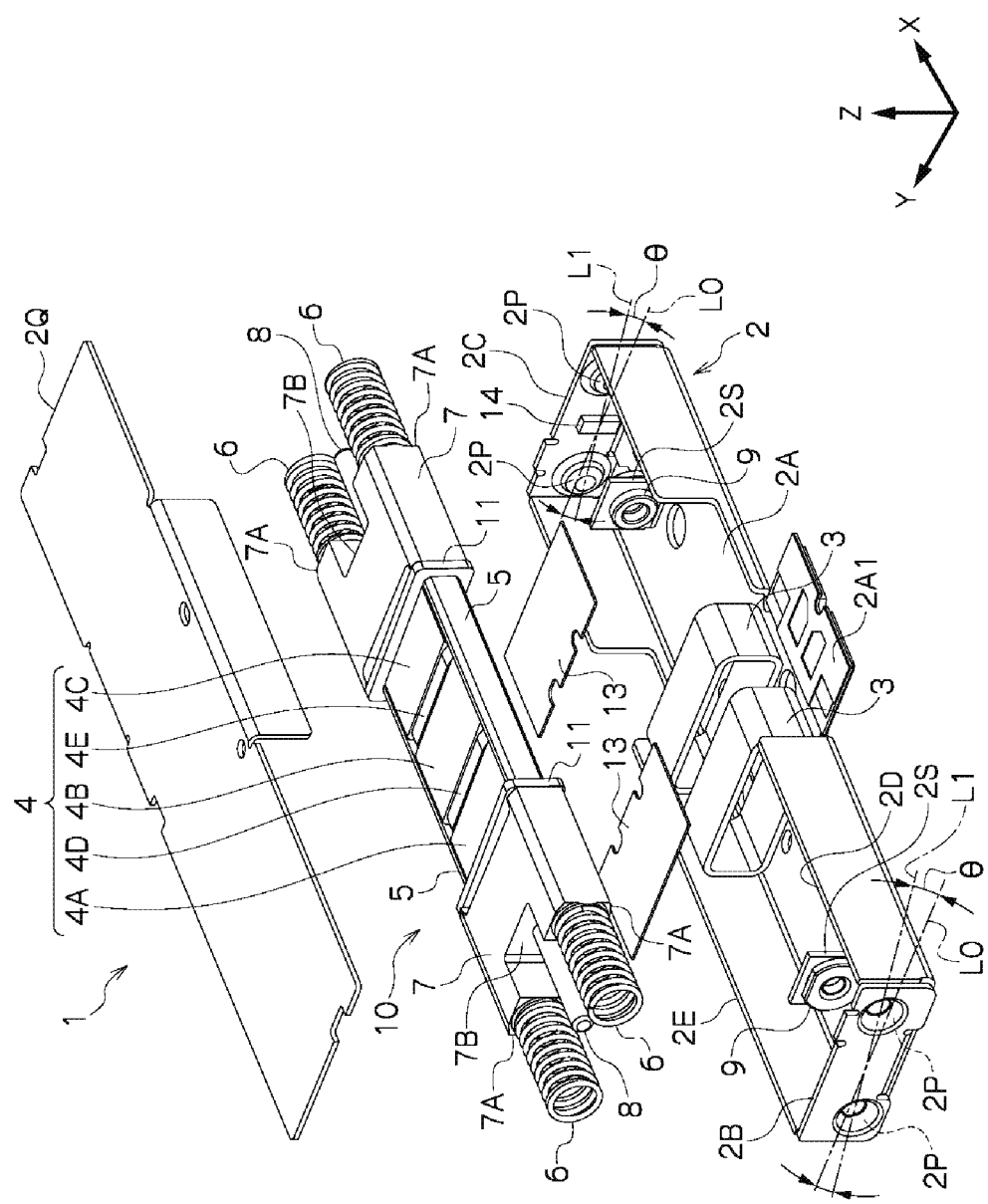
FIG. 1 is an explanatory diagram (an assembly perspective diagram) illustrating a linear vibration motor according to an example according to the present invention.
Figure 2:
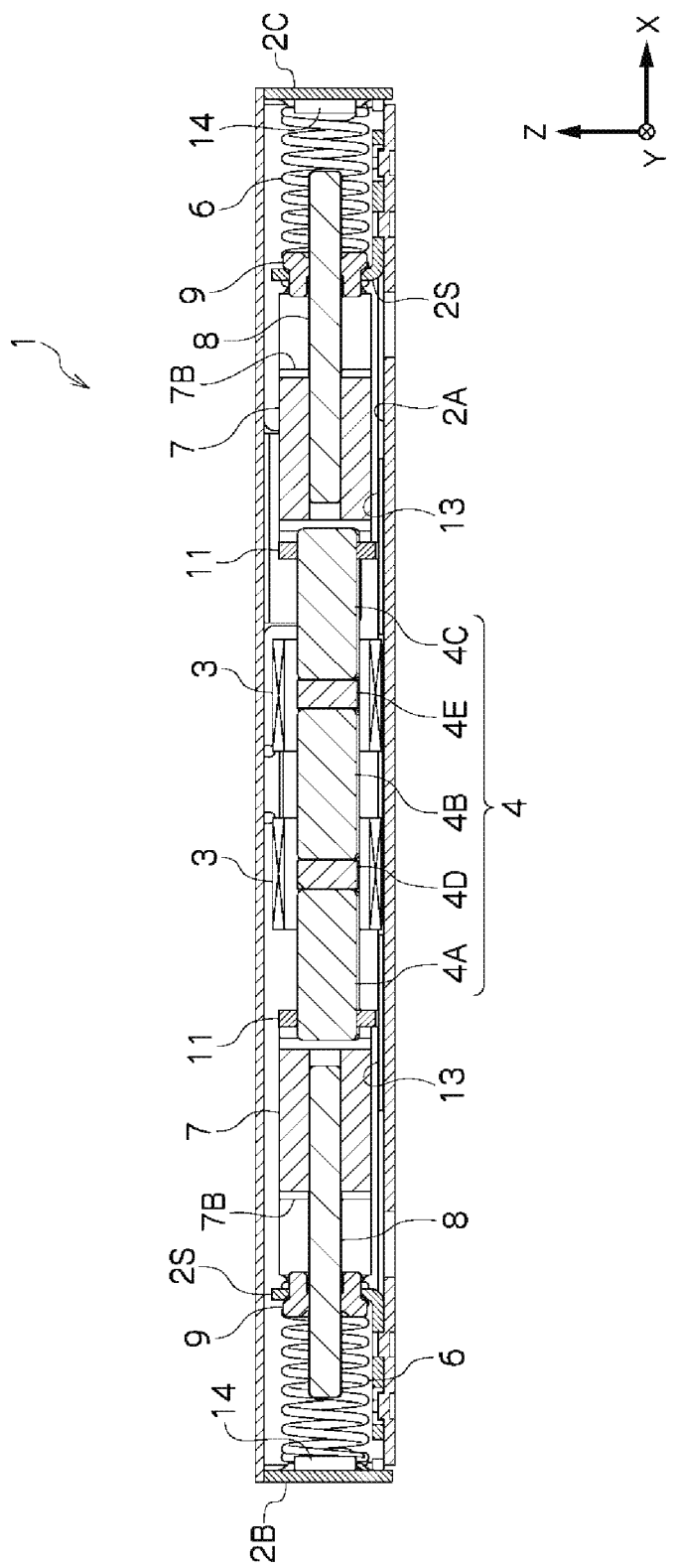
FIG. 2 is an explanatory diagram (a cross-sectional view) illustrating a linear vibration motor according to an example according to the present invention.

FIG. 1 through FIG. 3 illustrate a linear vibration motor according to an example according to the present invention. The linear vibration motor 1 comprises: a movable element 10 that is equipped with a magnet portion 4 and a weight portion 7; a frame 2 that contains the movable element 10; a coil 3 that is secured to the frame 2; an elastic member 6 that is disposed within the frame 2; and a guide shaft 8 that is borne on the frame 2.

The coil 3 applies, to the magnet portion 4, a driving force for driving the axial direction, where the elastic member 6 applies, to the movable element 10, an elastic force for repelling the driving force that is applied to the magnet portion 4. The guide shaft 8 guides reciprocating vibration of the movable element 10 along the axial direction. Additionally, the elastic member 6 rotationally biases the movable element 10 in one direction around the guide shaft 8, and the frame 2 comprises a slide bearing portion (slide plate 13) for supporting slidably in a portion of the movable element 10 that is rotationally biased.

Such as a linear vibration motor 1 enables the shape of the movable element 10 to be made thinner, enables prevention of the production of actuation noise due to rotation of the movable element 10 around the vibrational axis, and enables achievement of stabilized vibration without rattling, because, despite the movable element 10 having a flat cross-sectional shape a portion of the movable element 10 slides on the slide bearing portion (the slide plate 13) during the vibration. In this case, there is no need to adjust the parallel alignment of the axes, because there is only a single guide shaft 8, eliminating the need for high precision assembly, enabling an improvement in manufacturability. Moreover, with a single guide shaft 8 it is possible to achieve a reduction in size in the thickness direction and in the width direction.

While the present invention will be explained in detail below referencing the drawings, examples according to the present invention are not limited thereto.

The frame 2 may have a frame structure that is able to contain the various portions; however, in the example that is illustrated, side walls 2B, 2C, 2D, and 2E are provided extending from the periphery of a rectangular bottom face 2A. Moreover, the frame 2 is provided with a cover plate 2Q that covers the content within the frame 2. The cover plate 2Q is formed in a rectangular plate shape that is attached to the top end faces of the side walls 2B through 2E. The frame 2 can be formed through machining (pressing processes, etc.) on a metal plate. In the example that is illustrated, the frame 2 has a thin essentially rectangular solid shape (a box shape) wherein the dimension in the direction of thickness (the Z direction in the figure) is less than the dimension in the direction of width (the Y direction in the figure), and the dimension in the direction of vibration (the X direction) in the figure is greater than the dimension in the width direction.

A linear vibration motor 1 is structured from a coil 3 that is secured to the frame 2, and a magnet portion 4 that is a portion of the movable element 10. A vibration-generating current (for example, an alternating current at a resonant frequency that is determined by the mass of the movable element 10 and the coefficient of elasticity of the elastic member 6) is inputted into a coil 3 that is secured to the frame 2 from a signal inputting portion 2A1 that is provided on the frame 2, to produce Lorentz forces (driving forces) along the axial direction (the X direction in the figure) in the magnet portion 4.

In the magnet portion 4, flat rectangular magnet pieces 4A, 4B, and 4C that have polarities along the axial direction (the X direction in the figure) are multiply disposed with identical poles facing each other, connected with spacers 4D and 4E interposed therebetween. The spacers 4D and 4E may be of either a magnetic material or a non-magnetic material, and need only be able to maintain, at a prescribed spacing, the distance between adjacent similar poles of the magnet pieces 4A, 4B, and 4C. Here an example wherein three magnet pieces 4A, 4B, and 4C are provided is illustrated; however there may be two, or four or more, magnet pieces instead. If necessary, a reinforcing plate 5 is secured to a side face of the magnet portion 4 to increase the rigidity of the magnet portion 4 thereby.

In the coil 3, an electric wire is wound along the Y and Z directions around the magnet portion 4 wherein the direction of the magnetic pole faces the X direction, with the top face and/or bottom face thereof and, if necessary, a side face thereof as well, secured to the inner surface of the frame 2. Securing of the coil 3 to the frame 2 may be through securing directly to the frame 2, or the coil 3 may be wound onto a coil bobbin with the coil bobbin secured to the frame 2.

In the example that is illustrated, in the movable element 10, weight portions 7 are connected to both end portions of the magnet portion 4 in the axial direction (the X direction in the figure). The weight portion 7 may be structured through, for example, a metal material with a high specific density (such as tungsten), and, in the example that is illustrated, has a rectangular cross-sectional shape that has a Z-direction height that is greater than the thickness of the magnet portion 4, and a width in the Y direction that is greater than the width of the magnet portion 4. The weight portion 7 is connected to the magnet portion 4 through a connecting member 11.

A pair of guide shafts 8 is borne on the frame 2. The pair of guide shafts 8 are disposed split along one axial direction (the X direction in the figure), with one end side of each secured to the weight portions 7, and the other end sides thereof forming free ends that protrude in mutually opposing directions. Preferably the guide shafts 8 are disposed coaxially with the centroid axis of the movable element 10, to guide the vibration of the movable element 10 along the axial direction. Here the guide shaft 8 is Split and installed; however the guide shaft 8 may instead penetrate through the magnet portion 4 and be secured, or may penetrate through the magnet portion 4 and be supported slidably. Shock absorbing members 14, for absorbing the impact when the end portions of the guide shaft 8 strike, are provided on the side walls 2B and 2C of the frame 2.

The weight portions 7 comprise guide shaft supporting portions 7B for supporting guide shafts 8. The guide shaft supporting portion 7B is a part that is recessed along the axial direction from an end portion 7A of the weight portion 7, where the guide shaft 8 that has one end thereof supported on the guide shaft supporting portion 7B is supported slidably, along the axial direction (the X direction in the drawing), on a bearing 9 that is attached, through a supporting portion 2S on the bottom face 2A of the frame 2. At this time, the guide shaft supporting portion 7B of the weight portion 7 is provided with a width that is able to contain a bearing 9, where the bearing 9 is inserted into the guide shaft supporting portion 7B to secure a large amplitude for the movable element 10.

The elastic members 6 are disposed non-coaxially with the pair of guide shafts 8 along the axial direction, and apply, to the movable element 10, elastic forces that oppose the driving forces produced by the coil 3 and the magnet portion 4. In the example in the figure, a coil spring that extends and compresses along the axial direction (the X direction) is used for the elastic member 6.

Such elastic members 6 are disposed on both sides, with the guide shaft 8 held therebetween, with two elastic members 6, on one side, interposed between the weight portion 7 and the side wall 2B or 2C of the frame 2. One end of the elastic member 6 engages with a supporting protrusion 2P that is provided on the side wall 2B or 2C of the frame 2, and the other end of the elastic member 6 engages with a supporting protrusion that is provided on the end portion 7A of the weight portion 7.

The elastic member 6 is disposed so as to rotationally bias the movable element 10 in one direction around the guide shaft 8. In the example in the figure, the supporting protrusions 2P that are provided on the side wall 2B and on the side wall 2C, which each support one end side of the elastic member 6, are position so that the elastic forces of the elastic members 6 are applied in a direction that is an angle relative to the axial direction of the guide shaft 8.

In the example illustrated in FIG. 1 and FIG. 3, the pair of supporting protrusions 2P that are disposed on the left and right of the guide shaft 8 are disposed at an angle relative to the bottom face 2A of the frame 2 (inclined so that there is an angle θ between the line L1 that connects the centers of the pair of supporting protrusions 2P and the line L0 that is parallel to the bottom face 2A of the frame 2). Disposing the supporting protrusions 2P in this way causes the elastic forces of the elastic members 6 that are disposed on the left and right of the guide shaft 8 to each be inclined in different directions relative to the axial direction of the guide shaft 8. As illustrated in FIG. 3 (b), these elastic forces cause the movable element 10 to be biased rotationally around the axis 8G of the guide shaft 8.

At this time, the pair of supporting protrusions for supporting the elastic members 6 on the weight portion 7 side are disposed lined up in parallel with the long edge of the weight portion 7. Moreover, conversely the pair of supporting protrusions for supporting the elastic members 6 on the weight portion 7 side may be inclined relative to the long edge of the weight portion 7, with the pair of supporting protrusion 2P for supporting the elastic members 6 on the frame 2 side disposed in parallel to the long edge of the frame 2. That is, in applying a rotational bias to the movable element 10 around the axis 8G of the guide shaft 8, the line connecting the center of the pair of supporting protrusion 2P and the line connecting the centers of the pair of supporting protrusions for supporting the elastic members 6 on the weight portion 7 side should, when viewed from the front, cross each other.

As illustrated in FIG. 3 (b), in the movable element 10, the cross-sectional shape, crossing in the axial direction (the X direction in the figure), is provided with a long edge. Specifically, the movable element 10 has a rectangular cross-section that has a long edge and a short edge. In addition, the frame 2 comprises a pair of mutually facing inner surfaces along the long edge thereof (an inner surface of the cover plate 2Q, and a bottom face 2A), where at least one side of these inner surfaces (which, in the example in the figure, is the bottom face 2A side) is provided with a slide bearing portion (a slide plate 13). Through this, the movable element 10 will always be in a state wherein one side is in contact with the slide bearing portion (the slide plate 13) due to the rotational biasing around the guide shaft 8 by the elastic force of the elastic members 6.

The slide plate 13 that serves as the slide bearing portion may use, for example, that wherein a high-hardness and highly slippery (low-friction) surface coating, such as chrome plating, or the like, is coated onto a non-magnetic and high-strength base material, such as titanium, copper, or the like. In the example in the figure, the slide bearing portion is formed from a slide plate 13; however, there is no limitation thereto, and instead a low-friction/high-strength coating may be applied to a portion of the bottom plate 2A in the frame 2, to serve as the slide bearing portion.

In the example illustrated in FIG. 3 (b), the connecting member 11 for connecting the magnet portion 4 and the weight portion 7 is provided with a shape that protrudes to the bottom face 2A side, relative to the magnet portion 4 and the weight portion 7. Through this, when the movable element 10 rotates around the guide shaft 8, a portion of the connecting member 11 will contact the slide bearing portion (the slide plate 13) over the bottom face 2A.

Moreover, in the example in the figure, the cross-sectional shape that is crossed in the axial direction (the X direction) of the weight portion 7 has a long edge (and a short edge), where the connecting member 11 connects the magnet portion 4 and the weight portion 7 so that the long edge of the weight portion 7 will be essentially parallel with the inner surface of the frame 2 (the inner surface of the cover plate 2Q and the bottom face 2A) in a state wherein the portion thereof (a contacting portion 11A) is in contact with the slide bearing portion (the slide plate 13). There is no limitation to the example in the figure, but rather the connecting member 11 may connect the magnet portion 4 and the weight portion 7 in a state wherein a portion of the connecting member 11 is in contact with the slide bearing portion, so that the long edge of the magnet portion 4 and the long edge of the weight portion 7 are essentially parallel to the inner surface of the frame 2.

The operation of such a linear vibration motor 1 will be explained. Given this, when the vibration generating current of a resonant frequency that is determined by the mass of the movable element 10 and the coefficient of elasticity of the elastic members 6 is inputted into the coil 3, a driving force in the X direction is applied to the magnet portion 4, and the movable element 10 is caused, by the driving force and the elastic repelling force of the elastic members 6, to undergo reciprocating vibration along the axial direction (the X direction in the figure). At this time, a rotational force in one direction around the guide shaft 8 is applied to the movable element 10 through the elastic forces of the elastic members 6 that are applied in a state that is inclined relative to the axis of the guide shaft 8.

The movable element 10 has, for example, a cross-sectional shape that, perpendicular to the guide shaft 8, is a rectangular shape. Moreover, because the connecting member 11 that connects the magnet portion 4 and the weight portion 7 of the movable element 10 is provided with a contacting portion 11A that protrudes downward, the contacting portion 11A contacts the slide plate 13 that is provided on the bottom face 2A, due to the rotational bias around the guide shaft 8, and thus contacts the slide plate 13, and sliding thereon, with little friction. At this time, there will be no conduct with the inner surface of the cover plate 2Q above the movable element 10.

Through this, the movable element 10 will slide in a state wherein the contacting portion 11A, which is a portion of the movable element 10, is in constant contact with the slide plate 13 during the reciprocating motion along the guide shafts 8. Through this, the movable element 10 is able to undergo stable operation, without rattling, thus enabling the provision of linear vibration motor 1 with reduced actuation noise when vibrating.

Such a linear vibration motor 1 enables increased service life of the linear vibration motor 1 through the use of a surface that reduces sliding wear for the surface of the slide plate 13 on which the contacting portion 11A slides. Moreover, when the movable element 10 is rotated around the guide shaft 8, the contacting portion 11A will always contact the slide plate 13, making it possible to prevent the movable element 10 from contacting other parts of the frame 2, which can prevent deformation when there is a mechanical shock, enabling provision of linear vibration motor 1 that has a shock-resistant structure. Moreover, coating the slide plate 13 with a high-hardness surface coating (surface treatment) on a base material that is of higher strength than the frame 2, enables an improvement in the shock-resistant structure without affecting the material of the frame 2.

Moreover, in the linear vibration motor 1 that is illustrated, the pair of guide shafts 8 is split and does not pass through the magnet portion 4, making it possible to secure a magnet volume that is able to produce an adequate driving force through a magnet portion 4 that is thin in the Z direction and wide in the Y direction, regardless of the diameter of the pair of guide shafts 8. This enables the production of a thin linear vibration motor 1 able to produce a sufficient driving force.

Moreover, the linear vibration motor 1, wherein the movable element 10 is supported by the pair of guide shafts 8 that are disposed coaxially is able to reduce the width on the left and the right, because there is no need for shaft placement space on the left and right of the magnet portion 4, when compared to the prior art wherein a pair of stationary shafts that extend along the direction of vibration is provided on both the left and the right sides of the magnet.

Furthermore, disposing the elastic members 6 off-axis in relation to the pair of guide shafts 8 enables a reduction in the diameter of the elastic members 6 regardless of the diameter of the pair of guide shafts 8. When the diameters of the elastic members 6 are reduced, the elastic force can be set as appropriate through the selection of the material for the elastic members 6, and through providing a plurality of elastic members 6 in parallel. This can also reduce the thickness of a linear vibration motor 1 wherein a movable element 10 is supported on a shaft.

FIG. 4 depicts another example configuration wherein the elastic force of the elastic member 6 is applied in a direction that is at an angle relative to the axial direction of the guide shaft 8. In this example, the direction of protrusion 2P is inclined relative to the direction of the axis 8G of the guide shaft 8, to cause the direction in which the elastic member 6 is disposed to be inclined relative to the axis 8G. In inclining the direction of protrusion of the supporting protrusion 2P, the side wall 2B (2C) in the frame 2 may be inclined somewhat from being perpendicular to the bottom face 2A, or the side wall 2B (2C) itself may be formed so as to be perpendicular to the bottom face 2A, with the direction in which the supporting protrusion 2P is machined being inclined somewhat from being perpendicular to the side face of the side wall 2B.

FIG. 5 illustrates another form of a linear vibration motor 1 according an example according to the present invention. The linear vibration motor 1 according to the present example comprises a frame 2 and a magnetic attracting portion (a magnetic plate 12) for attracting the movable element 10, through magnetism, in one direction around the guide shaft 8, and, in the same manner as in the example set forth above, the frame 2 comprises a slide bearing portion (a slide plate 13) that supports slidably a portion of the movable element 10. In this example, the frame 2 itself is formed from the non-magnetic material, and the magnetic plate 12, is provided on the inner surface of the cover plate 2Q, at an end thereof in the Y direction in the figure, extending in the X direction in the figure, so as to form a magnetic attracting portion. The magnetic plate 12 is formed from an iron plate, or the like, and is attached at a position that is away from the center of rotation of the movable element 10.

In the example illustrated in FIG. 5, the magnetic attracting portion is formed through the magnetic plate 12, and the slide bearing portion is formed by the slide plate 13; however, there is no limitation thereto, but rather the magnetic attracting portion may be formed through adhering a layer of a magnetic material, or a film of a magnetic material, onto part of the inner surface of the cover plate 2Q, and a portion of the bottom plate 2A may be coated with a low-friction/high-strength coating, to produce the slide bearing portion.

In this way, a rotational force through magnetic attraction in one direction around the guide shaft 8, in addition to the rotational biasing by the elastic force of the elastic members 6, described above, is applied to the movable element 10 through the magnetic attraction between the magnet portion 4 and the magnetic plate 12 that is disposed in a position that is away from the center of rotation of the movable element 10 (the axis 8G of the guide shaft 8) of the linear vibration motor 1.

Through this, the movable element 10 is rotationally biased in one direction around the guide shaft 8 by the elastic force of the elastic member 6 and the magnetic attraction between the magnetic plate 12 and the magnet portion 4 at the time of reciprocating vibration along the guide shaft 8, so that the contacting portion 11A, which is a portion of the movable element 10, will slide in a state that is always in contact with the slide plate 13. Through this, in the same manner as in the examples set forth above, the movable element 10 can be caused to undergo stable operation, without rattling, thus enabling a linear vibration motor that has reduced actuation noise when vibrating.

FIG. 6 illustrates another form of a linear vibration motor 1 according an example according to the present invention. While in this example one end side of the pair of guide shafts 8 is secured to the frame 2, the other end side is borne slidably on the movable element 10 side, the other structures are the same as in the example set forth above.

In the example in the figure, one end side of each of the pair of guide shafts 8 is supported on the frame 2, at two points. Specifically, the end portion of the guide shaft 8 is secured to the side wall 2B or 2C of the frame 2, and, further, is supported by a supporting portion 2S that is away from the end portions of the guide shaft 8.

A hole 7C, into which the free end side (the other end side) of the guide shaft 8 is inserted is provided along the axial direction (the X direction in the figure) in the movable element 10. A bearing 9, which enables the guide shaft 8 to slide in the X direction, is provided in the interior of the hole 7C, where the other end side of the guide shaft 8 is supported thereby on the movable element 10 so as to be able to slide on the bearing 9. The hole 7C that is provided in the movable element 10 is provided in the weight portion 7 of the movable element 10, where there is no hole in the magnet portion 4 of the movable element 10.

In this way, the weight portion 7 of the linear vibration motor 1 can be formed in a parallelepiped-shape, and holes 7C that are enough for the guide shafts 8 to pass therethrough may be formed therein, enabling the volume of the weight portion 7 to be adequately large. This makes it possible to ensure adequate mass for the movable element 10 to produce the inertial forces for vibration.

As explained above, the linear vibration motor 1 according to an example according to the present invention, through reducing the thickness dimension of the movable element 10 to less than that of the width dimension, enables the thickness of the linear vibration motor to be reduced, and despite the movable element 10 being in a flat form in this way, enables prevention of actuation noise that would be caused uncontrolled rotation of the movable element 10 around the guide shaft 8. This enables stabilized vibration without rattling, and enables improved manufacturability when compared to the case wherein two parallel stationary shafts are provided.

Moreover, vibrating the movable element 10 while being supported axially by the pair of guide shafts 8 can produce a vibration that is as stabilized as a case wherein stationary shafts are provided, and can also achieve resistance to damage when there is a dropping impact, or the like. Additionally, such a linear vibration motor 1 can be made thinner and more compact in the width direction and can suppress suppressing a reduction in the volume of the magnet portion 4 and the weight portion 7.

FIG. 7 shows a mobile information terminal 100 as an example of an electronic device equipped with a linear vibration motor 1 according to an example according to the present invention. The mobile information terminal 100 that is equipped with the linear vibration motor 1 that can produce a stabilized vibration and for which the thickness can be reduced and which can be made more compact in the width direction enables the user to be notified through a stabilized vibration that does not tend to produce noise, when there is an incoming call in a communication function or at the beginning or end of an operation such as an alarm function. Moreover, this makes it possible to produce a mobile information terminal 100 with high mobility and which facilitates design performance, through the linear vibration motor 1 having reduced thickness and being more compact in the width direction. Furthermore, because the linear vibration motor 1 is of a compact shape wherein the various components are contained within a frame 2 of a rectangular shape wherein the thickness is suppressed, it can be mounted, with excellent space efficiency, within a thinner mobile information terminal 100.

While examples according to the present invention were described in detail above, referencing the drawings, the specific structures thereof are not limited to these examples, but rather design variations within a range that does not deviate from the spirit and intent of the present invention are also included in the present invention. Moreover, insofar as there are no particular contradictions or problems in purposes or structures, or the like, the technologies of the various examples described above may be used together in combination.

The invention claimed is:

1. A linear vibration motor comprising:
   a movable element equipped with a magnet portion and a weight portion;
   a frame containing the movable element;
   a coil, secured to the frame, driving the magnet portion along an axial direction;
   an elastic member, disposed within the frame, applying, to the movable element, an elastic force that opposes the driving force that is applied to the magnet; and
   a guide shaft, borne on the frame, guiding reciprocating vibration along the axial direction of the movable element, wherein:
   the elastic member biases the movable element rotationally in one direction around the guide shaft and
   the frame comprises a slide bearing portion supporting slidably a portion of the movable element that is rotationally biased.

2. The linear vibration motor as set forth in claim 1, wherein:
   the elastic members are disposed on both sides with the guide shaft held therebetween.

3. The linear vibration motor as set forth in claim 1, wherein:
   the elastic member applies the elastic force in a direction that is at an angle relative to the axial direction of the guide shaft.

4. The linear vibration motor as set forth in claim 1, wherein:
   the frame comprises a magnetic attracting portion for magnetically attracting the movable element in one direction around the guide shaft.

5. The linear vibration motor as set forth in claim 1, wherein:
   in the movable element, the cross-sectional shape that is perpendicular to the axial direction, has a long edge;
   the frame has a pair of mutually facing inner surfaces along the long edge; and
   the slide bearing portion is provided on at least one side of the inner surface.

6. The linear vibration motor as set forth in claim 1, wherein:
   the magnet portion and the weight portion are connected through a connecting member, and a portion of the connecting member contacts the slide bearing portion.

7. The linear vibration motor as set forth in claim 6, wherein:
   in the weight portion, the cross-sectional shape that is perpendicular to the axial direction has a long edge; and
   in a state wherein, the portion of the connecting member is in contact with the slide bearing portion, the long edge is essentially parallel to the inner surface of the frame.

8. The mobile electronic device comprising a linear vibration motor as set forth in claim 1.

* * * * *